(12) United States Patent
Mullen (10) Patent No.: US 7,885,401 B1
(45) Date of Patent: Feb. 8, 2011

(54) METHOD AND APPARATUS TO FORECAST THE AVAILABILITY OF A RESOURCE

(75) Inventor: David Clarence Mullen, Newcastle, WA (US)

(73) Assignee: Avaya Inc., Basking Ridge, NJ (US)

( * ) Notice: Subject to any disclaimer, the term of this patent is extended or adjusted under 35 U.S.C. 154(b) by 1695 days.

(21) Appl. No.: 10/813,509

(22) Filed: Mar. 29, 2004

(51) Int. Cl.
*H04M 3/00* (2006.01)

(52) U.S. Cl. .............. 379/265.05; 379/265.11; 379/266.08

(58) Field of Classification Search .......... 379/265.1, 379/265.11
See application file for complete search history.

(56) References Cited

U.S. PATENT DOCUMENTS

| | | | |
|---|---|---|---|
| 4,163,124 A | 7/1979 | Jolissaint | |
| 4,567,323 A | 1/1986 | Lottes et al. | |
| 4,737,983 A | 4/1988 | Frauenthal et al. | |
| 4,797,911 A | 1/1989 | Szlam et al. | |
| 4,829,563 A * | 5/1989 | Crockett et al. | 379/309 |
| 4,894,857 A | 1/1990 | Szlam et al. | |
| 5,001,710 A | 3/1991 | Gawrys et al. | |
| 5,097,528 A | 3/1992 | Gursahaney et al. | |
| 5,101,425 A | 3/1992 | Darland | |
| 5,155,761 A | 10/1992 | Hammond | |
| 5,164,983 A | 11/1992 | Brown et al. | |
| 5,206,903 A | 4/1993 | Kohler et al. | |
| 5,210,789 A | 5/1993 | Jeffus et al. | |
| 5,214,688 A * | 5/1993 | Szlam et al. | 379/266.08 |
| 5,274,700 A | 12/1993 | Gechter et al. | |
| 5,278,898 A | 1/1994 | Cambray et al. | |
| 5,291,550 A | 3/1994 | Levy et al. | |
| 5,299,260 A | 3/1994 | Shaio | |
| 5,309,513 A | 5/1994 | Rose | |
| 5,327,490 A * | 7/1994 | Cave | 379/266.01 |
| 5,335,268 A | 8/1994 | Kelly, Jr. et al. | |
| 5,335,269 A | 8/1994 | Steinlicht | |
| 5,390,243 A | 2/1995 | Casselman et al. | |

(Continued)

FOREIGN PATENT DOCUMENTS

CA  2143198  1/1995

(Continued)

OTHER PUBLICATIONS

Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.

(Continued)

*Primary Examiner*—Fan Tsang
*Assistant Examiner*—Khai N Nguyen
(74) *Attorney, Agent, or Firm*—Sheridan Ross P.C.

(57) ABSTRACT

The present invention is directed to systems and methods for providing an accurate forecast of resource availability within a determined forecast horizon. Statistics regarding time spent by resources in tasks that can be differentiated into or considered as a number of discrete segments are accessed to obtain a probability of resource completion of the task within the forecast horizon. In particular, statistics related to different task segments are combined to obtain a composite forecast of resource availability. Embodiments of the present invention may be applied to predictive dialer applications and workflow systems.

20 Claims, 4 Drawing Sheets

U.S. PATENT DOCUMENTS

| | | |
|---|---|---|
| 5,436,965 A | 7/1995 | Grossman et al. |
| 5,444,774 A | 8/1995 | Friedes |
| 5,469,503 A | 11/1995 | Butensky et al. |
| 5,469,504 A | 11/1995 | Blaha |
| 5,473,773 A | 12/1995 | Aman et al. |
| 5,479,497 A | 12/1995 | Kovarik |
| 5,500,795 A | 3/1996 | Powers et al. |
| 5,504,894 A | 4/1996 | Ferguson et al. |
| 5,506,898 A | 4/1996 | Costantini et al. |
| 5,530,744 A | 6/1996 | Charalambous et al. |
| 5,537,470 A | 7/1996 | Lee |
| 5,537,542 A | 7/1996 | Eilert et al. |
| 5,544,232 A | 8/1996 | Baker et al. |
| 5,546,452 A | 8/1996 | Andrews et al. |
| 5,570,419 A * | 10/1996 | Cave et al. ............. 379/266.08 |
| 5,592,378 A | 1/1997 | Cameron et al. |
| 5,592,542 A | 1/1997 | Honda et al. |
| 5,594,726 A | 1/1997 | Thompson et al. |
| 5,606,361 A | 2/1997 | Davidsohn et al. |
| 5,611,076 A | 3/1997 | Durflinger et al. |
| 5,627,884 A | 5/1997 | Williams et al. |
| 5,640,445 A * | 6/1997 | David .................... 379/112.01 |
| 5,642,515 A | 6/1997 | Jones et al. |
| 5,684,872 A | 11/1997 | Flockhart et al. |
| 5,684,964 A | 11/1997 | Powers et al. |
| 5,689,698 A | 11/1997 | Jones et al. |
| 5,703,943 A | 12/1997 | Otto |
| 5,713,014 A | 1/1998 | Durflinger et al. |
| 5,724,092 A | 3/1998 | Davidsohn et al. |
| 5,740,238 A | 4/1998 | Flockhart et al. |
| 5,742,675 A | 4/1998 | Kilander et al. |
| 5,748,468 A | 5/1998 | Notenboom et al. |
| 5,749,079 A | 5/1998 | Yong et al. |
| 5,751,707 A | 5/1998 | Voit et al. |
| 5,752,027 A | 5/1998 | Familiar |
| 5,754,639 A | 5/1998 | Flockhart et al. |
| 5,754,776 A | 5/1998 | Hales et al. |
| 5,754,841 A | 5/1998 | Carino, Jr. |
| 5,757,904 A | 5/1998 | Anderson |
| 5,790,677 A | 8/1998 | Fox et al. |
| 5,794,250 A | 8/1998 | Carino, Jr. et al. |
| 5,796,393 A | 8/1998 | MacNaughton et al. |
| 5,802,282 A | 9/1998 | Hales et al. |
| 5,818,907 A | 10/1998 | Maloney et al. |
| 5,825,869 A | 10/1998 | Brooks et al. |
| 5,828,747 A | 10/1998 | Fisher et al. |
| 5,838,968 A | 11/1998 | Culbert |
| 5,839,117 A | 11/1998 | Cameron et al. |
| 5,875,437 A | 2/1999 | Atkins |
| 5,880,720 A | 3/1999 | Iwafune et al. |
| 5,881,238 A | 3/1999 | Aman et al. |
| 5,884,032 A | 3/1999 | Bateman et al. |
| 5,889,956 A | 3/1999 | Hauser et al. |
| 5,897,622 A | 4/1999 | Blinn et al. |
| 5,903,641 A * | 5/1999 | Tonisson ............... 379/265.12 |
| 5,903,877 A | 5/1999 | Berkowitz et al. |
| 5,905,793 A | 5/1999 | Flockhart et al. |
| 5,915,012 A | 6/1999 | Miloslavsky |
| 5,926,528 A * | 7/1999 | David .................... 379/112.01 |
| 5,926,538 A | 7/1999 | Deryugin et al. |
| 5,930,786 A | 7/1999 | Carino, Jr. et al. |
| 5,937,051 A | 8/1999 | Hurd et al. |
| 5,937,402 A | 8/1999 | Pandit |
| 5,940,496 A | 8/1999 | Gisby et al. |
| 5,943,416 A | 8/1999 | Gisby |
| 5,948,065 A | 9/1999 | Eilert et al. |
| 5,960,073 A | 9/1999 | Kikinis et al. |
| 5,963,635 A | 10/1999 | Szlam et al. |
| 5,963,911 A | 10/1999 | Walker et al. |
| 5,970,132 A | 10/1999 | Brady |
| 5,974,135 A | 10/1999 | Breneman et al. |
| 5,974,462 A | 10/1999 | Aman et al. |
| 5,982,873 A | 11/1999 | Flockhart et al. |
| 5,987,117 A | 11/1999 | McNeil et al. |
| 5,991,392 A | 11/1999 | Miloslavsky |
| 5,996,013 A | 11/1999 | Delp et al. |
| 5,999,963 A | 12/1999 | Bruno et al. |
| 6,000,832 A | 12/1999 | Franklin et al. |
| 6,011,844 A | 1/2000 | Uppaluru et al. |
| 6,038,293 A | 3/2000 | McNerney et al. |
| 6,044,144 A | 3/2000 | Becker et al. |
| 6,044,205 A | 3/2000 | Reed et al. |
| 6,044,355 A | 3/2000 | Crockett et al. |
| 6,049,547 A | 4/2000 | Fisher et al. |
| 6,052,723 A | 4/2000 | Ginn |
| 6,055,308 A | 4/2000 | Miloslavsky et al. |
| 6,064,730 A | 5/2000 | Ginsberg |
| 6,064,731 A | 5/2000 | Flockhart et al. |
| 6,084,954 A | 7/2000 | Harless |
| 6,088,441 A | 7/2000 | Flockhart et al. |
| 6,115,462 A | 9/2000 | Servi et al. |
| 6,151,571 A | 11/2000 | Pertrushin |
| 6,154,769 A | 11/2000 | Cherkasova et al. |
| 6,163,607 A | 12/2000 | Bogart et al. |
| 6,173,053 B1 | 1/2001 | Bogart et al. |
| 6,175,564 B1 | 1/2001 | Miloslavsky et al. |
| 6,178,441 B1 | 1/2001 | Elnozahy |
| 6,185,292 B1 | 2/2001 | Miloslavsky |
| 6,192,122 B1 | 2/2001 | Flockhart et al. |
| 6,215,865 B1 | 4/2001 | McCalmont |
| 6,226,377 B1 | 5/2001 | Donaghue, Jr. |
| 6,229,819 B1 | 5/2001 | Darland et al. |
| 6,230,183 B1 | 5/2001 | Yocom et al. |
| 6,233,333 B1 | 5/2001 | Dezonmo |
| 6,240,417 B1 | 5/2001 | Eastwick et al. |
| 6,259,969 B1 | 7/2001 | Tackett et al. |
| 6,263,359 B1 | 7/2001 | Fong et al. |
| 6,272,544 B1 | 8/2001 | Mullen |
| 6,275,806 B1 | 8/2001 | Pertrushin |
| 6,275,812 B1 | 8/2001 | Haq et al. |
| 6,275,991 B1 | 8/2001 | Erlin |
| 6,278,777 B1 | 8/2001 | Morley |
| 6,292,550 B1 | 9/2001 | Burritt |
| 6,295,353 B1 | 9/2001 | Flockhart et al. |
| 6,353,810 B1 | 3/2002 | Petrushin |
| 6,356,632 B1 | 3/2002 | Foster et al. |
| 6,366,668 B1 | 4/2002 | Borst et al. |
| 6,389,028 B1 | 5/2002 | Bondarenko et al. |
| 6,389,132 B1 | 5/2002 | Price |
| 6,389,400 B1 | 5/2002 | Bushey et al. |
| 6,424,709 B1 | 7/2002 | Doyle et al. |
| 6,426,950 B1 | 7/2002 | Mistry |
| 6,427,137 B2 | 7/2002 | Petrushin |
| 6,430,282 B1 | 8/2002 | Bannister et al. |
| 6,434,230 B1 | 8/2002 | Gabriel |
| 6,449,356 B1 | 9/2002 | Dezonno |
| 6,449,358 B1 | 9/2002 | Anisimov et al. |
| 6,449,646 B1 | 9/2002 | Sikora et al. |
| 6,453,038 B1 | 9/2002 | McFarlane et al. |
| 6,463,148 B1 | 10/2002 | Brady |
| 6,463,346 B1 | 10/2002 | Flockhart et al. |
| 6,463,415 B2 | 10/2002 | St. John |
| 6,480,826 B2 | 11/2002 | Pertrushin |
| 6,490,350 B2 | 12/2002 | McDuff et al. |
| 6,535,600 B1 | 3/2003 | Fisher et al. |
| 6,535,601 B1 | 3/2003 | Flockhart et al. |
| 6,560,330 B2 | 5/2003 | Gabriel |
| 6,560,649 B1 | 5/2003 | Mullen et al. |
| 6,560,707 B2 | 5/2003 | Curtis et al. |
| 6,563,920 B1 | 5/2003 | Flockhart et al. |
| 6,597,685 B2 | 7/2003 | Miloslavsky et al. |
| 6,614,903 B1 | 9/2003 | Flockhart et al. |
| 6,650,748 B1 | 11/2003 | Edwards et al. |
| 6,697,457 B2 | 2/2004 | Petrushin |

| | | | |
|---|---|---|---|
| 6,704,409 | B1 | 3/2004 | Dilip et al. |
| 6,707,903 | B2 | 3/2004 | Burok et al. |
| 6,754,333 | B1 | 6/2004 | Flockhart et al. |
| 6,766,013 | B2 | 7/2004 | Flockhart et al. |
| 6,766,014 | B2 | 7/2004 | Flockhart et al. |
| 6,947,543 | B2 | 9/2005 | Alvarado et al. |
| 7,035,927 | B2 | 4/2006 | Flockhart et al. |
| 2002/0194002 | A1 | 12/2002 | Petrushin |
| 2003/0018762 | A1* | 1/2003 | Mullen ................... 709/223 |
| 2003/0174830 | A1 | 9/2003 | Boyer et al. |
| 2003/0177017 | A1 | 9/2003 | Boyer et al. |
| 2003/0185378 | A1 | 10/2003 | Mullen ............. 379/265.01 |
| 2004/0203878 | A1 | 10/2004 | Thomson |
| 2005/0138167 | A1* | 6/2005 | Whitman ................ 709/224 |

FOREIGN PATENT DOCUMENTS

| | | |
|---|---|---|
| CA | 2174762 | 3/1996 |
| EP | 0501189 | 9/1992 |
| EP | 0740450 | 10/1996 |
| EP | 0772335 | 5/1997 |
| EP | 0829996 | 3/1998 |
| EP | 0855826 | 7/1998 |
| EP | 0863651 | 9/1998 |
| EP | 0866407 | 9/1998 |
| EP | 899673 | 3/1999 |
| EP | 998108 | 5/2000 |
| EP | 1091307 | 4/2001 |
| EP | 1150236 | 10/2001 |
| GB | 2273418 | 6/1994 |
| GB | 2290192 | 12/1995 |
| WO | WO 96/07141 | 3/1996 |
| WO | WO 97/28635 | 8/1997 |
| WO | WO 98/56207 | 12/1998 |

OTHER PUBLICATIONS

Avaya, Inc. Business Advocate Options, at http://www.avaya.com, downloaded on Feb. 15, 2003, Avaya, Inc. 2003.
Avaya, Inc. Business Advocate Product Summary, at http://www.avaya.com, downloaded on Feb. 15, 2003, Avaya, Inc. 2003, 3 pages.
Avaya, Inc. CentreVu Advocate, Release 9, User Guide, Dec. 2000.
Avaya, Inc., "Better Implementation of IP in Large Networks," Avaya, Inc. 2002, 14 pages.
Avaya, Inc., "The Advantages of Load Balancing in the Multi-Call Center Enterprise," Avaya, Inc., 2002, 14 pages.
Avaya, Inc., "Voice Over IP Via Virtual Private Networks: An Overview," Avaya, Inc., Feb. 2001, 9 pages.
Bellsouth Corp., "Frequently Asked Questions—What is a registrar?," available at https://registration.bellsouth.net/NASApp/DNSWebUI/FAQ.jsp, downloaded Mar. 31, 2003, 4 pages.
Chavez, David, et al., "Avaya MultiVantage Software: Adapting Proven Call Processing for the Transition to Converged IP Networks," Avaya, Inc., Aug. 2002.
Coles, Scott, "A Guide for Ensuring Service Quality In IP Voice Networks," Avaya, Inc., 2002, pp. 1-17.
Dawson, "NPRI's Powerguide, Software Overview" Call Center Magazine (Jun. 1993), p. 85.
Doo-Hyun Kim et al. "Collaborative Multimedia Middleware Architecture and Advanced Internet Call Center," Proceedings at the International Conference on Information Networking (Jan. 31, 2001), pp. 246-250.
E. Noth et al., "Research Issues for the Next Generation Spoken": University of Erlangen-Nuremberg, Bavarian Research Centre for Knowledge-Based Systems, at http://www5.informatik.uni-erlangen.de/literature/psdir/1999/Noeth99:RIF.ps.gz, printed Feb. 10, 2003; 8 pages.
Foster, Robin, et al., "Avaya Business Advocate and its Relationship to Multi-Site Load Balancing Applications," Avaya, Inc., Mar. 2002, 14 pages.
Geotel Communications Corporation Web site printout entitled "Intelligent CallRouter" Optimizing the Interaction Between Customers and Answering Resources. 1998, 6 pages.
John H.L. Hansen and Levent M. Arsian, Foreign Accent Classification Using Source Generator Based Prosodic Features, IEEE Proc. ICASSP, vol. 1, pp. 836-839, Detroit USA (May 1995).
L.F. Lamel and J.L. Gauvain, Language Identification Using Phone-Based Acoustic Likelihood, ICASSP-94, date unknown; 4 pages.
Levent M. Arsian and John H.L. Hansen, Language Accent Classification in American English, Robust Speech Processing Laboratory, Duke University Department of Electrical Engineering, Durham, NC, Technical Report RSPL-96-7, revised Jan. 29, 1996. pp. 1-16.
Levent M. Arsian, Foreign Accent Classification in American English, Department of Electrical Computer Engineering, Duke University, Thesis, pp. 1-200 (1996).
MIT Project Oxygen, Pervasive, Human-Centered Computing (MIT Laboratory for Computer Science) (Jun. 2000) pp. 1-15.
Presentation by Victor Zue, The MIT Oxygen Project, MIT Laboratory for Computer Science (Apr. 25-26, 2000) 9 pages.
Stevenson et al.; "Name Resolution in Network and Systems Management Environments"; http://netman.cit.buffalo.edu/Doc/DStevenson/NR-NMSE.html; printed Mar. 31, 2003; 16 pages.
"Applications, NPRI's Predictive Dialing Package," Computer Technology (Fall 1993), p. 86.
"Call Center Software You Can't Outgrow," Telemarketing® (Jul. 1993), p. 105.
"Domain Name Services," available at http://www.pism.com/chapt09/chapt09.html, downloaded Mar. 31, 2003, 21 pages.
"eGain's Commerce 2000 Platform Sets New Standard for eCommerce Customer Communications," Business Wire (Nov. 15, 1999)., 3 pages.
"Internet Protocol Addressing," available at http://samspade.org/d/ipdns.html, downloaded Mar. 31, 2003, 9 pages.
"Product Features," Guide to Call Center Automation, Brock Control Systems, Inc., Activity Managers Series™, Section 5—Company B120, p. 59, 1992.
"Product Features," Guide to Call Center Automation, CRC Information Systems, Inc., Tel-ATHENA, Section 5—Company C520, p. 95, 1992.
"VAST™, Voicelink Application Software for Teleservicing®," System Manager User's Guide, Digital Systems (1994), pp. ii, vii-ix, 1-2, 2-41 through 2-77.
"When Talk Isn't Cheap," Sm@rt Reseller, v. 3, n. 13 (Apr. 3, 2000), p. 50.

* cited by examiner

METHOD AND APPARATUS TO FORECAST THE AVAILABILITY OF A RESOURCE

FIELD OF THE INVENTION

The present invention is related to forecasting agent arrival. In particular, the present invention is related to forecasting the future availability of an agent for a new work assignment.

BACKGROUND OF THE INVENTION

A predictive dialer is a system that generates outbound calls from a call center. Outbound calls that reach a live called party (i.e., a human being answers the call) are connected to call center agents for handling, i.e., servicing. Such answered calls for which no agent is immediately available to service them are referred to as nuisance calls. Nuisance calls are possible because the predictive dialer initiates calls without a priori assignment and connection of agents to the generated calls. Furthermore, because generated calls can go unanswered or may be answered by a machine as opposed to a live called party, the predictive dialer typically initiates more outbound calls than there are agents available to service them. With automatic call classification of whether or not, and by what, an outbound call has been answered, the call center determines the need for an agent only when the call is answered. The call center then attempts to match and connect the call answered by a live party to an individual agent for immediate servicing.

A call center has the conflicting objectives of minimizing agent idle time while minimizing the numbers of nuisance calls. But two characteristics of telephone calling are inherently problematic for agent utilization. The first is the long ring time required to reach a called party, and the second is a high incidence of call attempts that result in failure to connect to a live called party. Without predictive dialing, agents would spend considerable time waiting for ringing phones to be answered. When a ringing phone is not answered, the agent would have to wait again for results of the next call attempt. Predictive dialing attempts to reduce agent wait-times. However, reducing agent wait-times is not without the risk of connecting to a called party without an agent being available to service the call.

In a predictive dialing environment, agents are presently unavailable because they are performing tasks that are designated to be un-interruptible. That is, an agent can do only one task at a time and cannot start a new task until the previous task is completed. Additionally, only one agent can usually be assigned to a particular task. The tasks typically involve live clients in a transaction, and background fulfillment tasks may be dynamically interspersed amongst them. Agents that are presently handling tasks are rendered unavailable. However, each unavailable agent can be expected to complete his or her task with a particular probability over a future time interval.

Existing predictive dialers use various methods and algorithms to systematically initiate calls before agents are available to handle them. Whatever is the basic method that a dialer employs, it attempts to achieve a balance between agent utilization and nuisance-call rates. Such balancing typically employs heuristics realized in the predictive dialer's dialing algorithm. For example, a dialer may consider an agent available after the agent has spent a certain amount of time working a call, and initiate new calls depending on the dialer's hit rate. For instance, if the hit rate is 1/3, 3 calls will be initiated so that a live person can be expected to have been reached at about the time an agent is predicted to be available. Accordingly, predictive dialers have been oriented towards keeping agents busy. However, dialers face many dynamic and unsystematic variations in characteristics of the called population, characteristics of the calling campaign, spontaneous assignment of agents to other work, and inconsistent behavior of agents. These variations tend to upset any real balance between agent utilization and nuisance-call rates. The existing predictive methods do not sufficiently compensate for the unsystematic uncertainty in their predictive models. Either there is excessive agent idle time (detected as an excess service level), or there is lack of promptness in responding to called parties who answer (detected as an insufficient service level). A service level is a percentage or a ratio of those transactions out of all transactions that satisfy some criterion of "goodness."

One technique used by predictive dialers has been to consider the probability that an agent will finish a task within a selected amount of time based on the amount of time that the agent has spent on a call the agent is presently handling. However, such systems fail to consider correlations that may exist between talk time and wrap-up time. For example, such systems may result in an unrealistically high probability that an agent will become available within a selected period of time when the agent's time in talk state becomes longer than normal. Other systems have simply considered the average time to advance in a wait queue, without consideration of the agents' states. Because of the deficiencies in previous systems, the consistent achievement of higher service levels (i.e. the avoidance of nuisance calls), for example 99% of calls made to a live person are connected to an agent that is immediately available, has been impossible.

As a result of increasing concern about nuisance calls, regulations attempting to prevent or limit the occurrence of such calls have been implemented. These regulations can impose fines for calls that are completed to a live person but that are not also immediately connected to an agent. At the same time, it remains important to keep agents busy. Therefore, it has become increasingly important to improve the accuracy of predictive dialers to avoid instances of nuisance calls while at the same time avoiding having agents idle.

SUMMARY OF THE INVENTION

The present invention is directed to solving these and other problems and disadvantages of the prior art. According to embodiments of the present invention, the probability of completing a task that can be broken into a number of differentiated segments is determined by determining the probabilities with respect to such differentiated segments. In accordance with further embodiments of the present invention, the probability of completing a task determined with respect to the entire task is combined with the probability obtained by determining the probabilities with respect to the differentiated segments. The probability of completing a task may be determined with reference to a selected time horizon or forecast horizon.

In accordance with exemplary embodiments of the present invention, talk time statistics are used in combination with wrap-up time statistics to predict a time at which an agent will become available. Accordingly, by applying forecasts from a number of different models, greater granularity is available, allowing predictions to be made with improved accuracy. In accordance with further embodiments of the present invention, the predictions made using talk time statistics and wrap-up time statistics are combined with total handle time statistics to make a prediction as to agent availability within a forecast horizon. The forecast time horizon generally depends on the context of the system. For example, the forecast time horizon may comprise a predicted time to a customer contact on the next call attempt.

In accordance with embodiments of the present invention, the probability of completing a talk state within a time horizon, and the probability of completing a wrap-up state within the time horizon, are multiplied by one another. Because the product of the multiplication results in a time horizon that is effectively twice that of the time horizon used to determine the probabilities, the product may be divided by two. In accordance with embodiments of the present invention, the time horizon over which the probabilities are determined is selected to be equal to the mean time at which a live called party is expected to be available in response to a new call attempt.

The statistics applied may be differentiated based on the type of task they present to an agent. For example, tasks may be differentiated based on the channel type, the relationship between the agent and the other party associated with the task, a classification of the other party, the type of transaction, etc. Furthermore, embodiments of the present invention may be applied in connection with customer service applications, predictive dialing applications, or other applications in which a resource is engaged in a task that may be considered as a set of segments, and in which a forecast time horizon within which a next resource will be required is made.

DETAILED DESCRIPTION

Figure 1:
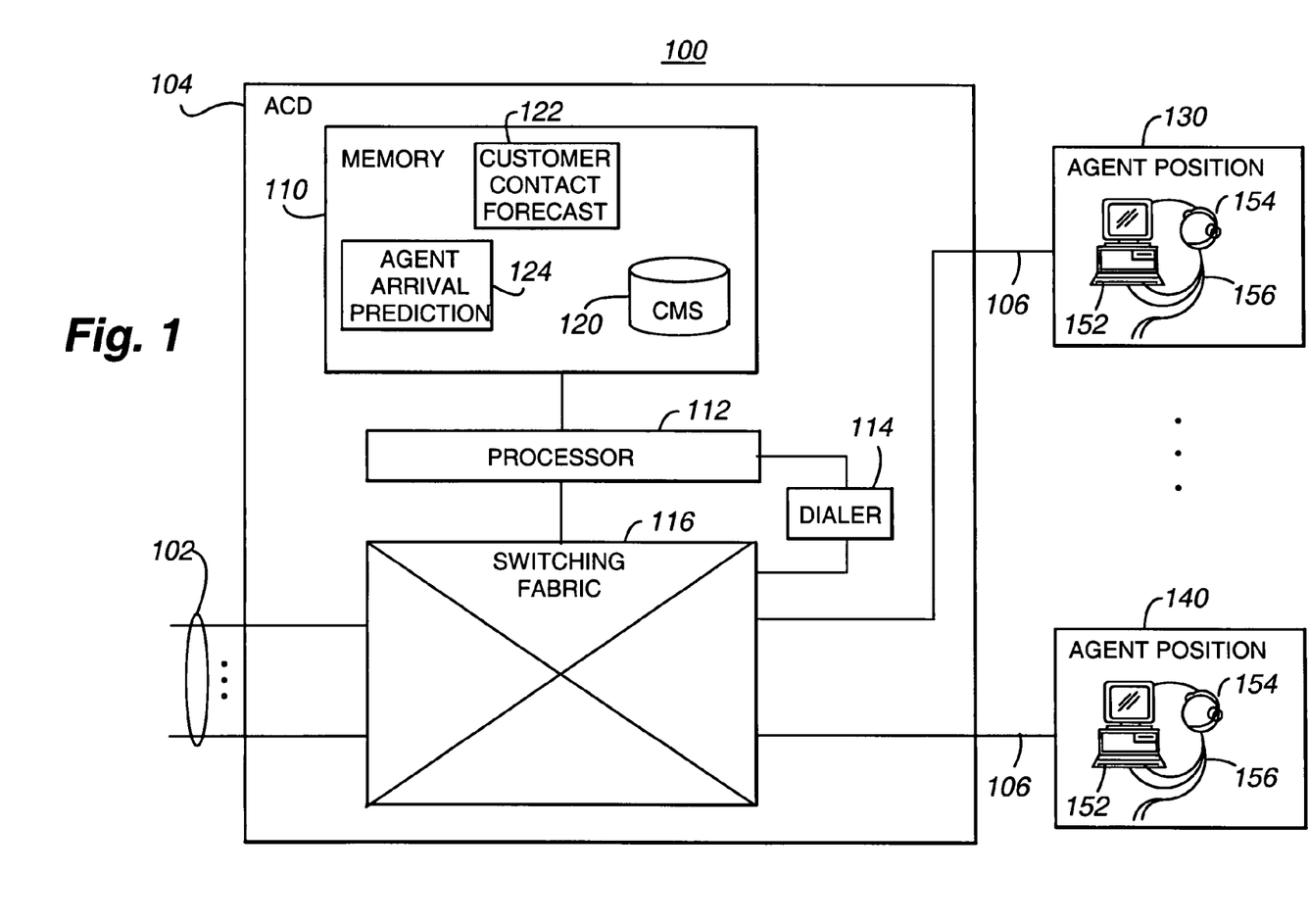
FIG. 1 is a block diagram depicting components of a system in accordance with embodiments of the present invention.

With reference now to FIG. 1, a block diagram of a system 100 in accordance with embodiments of the present invention is illustrated. As shown in FIG. 1, the system 100 may include a call center including an automatic call distributor (ACD) 104 that interconnects agent positions 130-140 via calls with the outside world to which it is connected by communications trunks 102. In accordance with embodiments of the present invention, the communications trunks may comprise communications channels established over the public switched telephone network (PSTN), leased lines, the Internet, a private intranet, or any other communications networks, alone or in combination. ACD 104 is a stored program-controlled apparatus that operates under control of a processor 112 that obtains and stores data in, and executes stored programs out of, memory 110 or any other computer-readable medium. Programs in memory 110 include a call classifier, which analyzes the signals on a call connection to distinguish control signals from other signals (e.g., voice, music) and to determine their meaning. Data in memory 110 may include historical and operational data of the ACD 104 and of agents 156, which are stored in a call management system (CMS) database 120. Processor 112 controls the operation of a switching fabric 116 and of a predictive dialer 114 that generates outgoing calls on the trunks 102 through the switching fabric 116. Each agent position 130-140 includes a terminal 152, such as a personal computer, and a voice communications device, such as a telephone or a headset 154, for use by an agent 156.

For purposes of the discussion herein, a call, whether incoming or outgoing, constitutes a task to be served, and an agent position 130-140 that is presently staffed by an agent 156 constitutes a resource for serving tasks. In addition, although certain examples provided herein are in the context of a call center for handling voice calls, the present invention is not so limited. For example, embodiments of the present invention may be applied in connection with systems for distributing tasks, including real time tasks, to resources in which the duties of agents or other resources can be differentiated or segmented.

According to an illustrative embodiment of the invention, memory 110 of the ACD 104 includes a customer contact forecast function 122. The contact forecast function 122 could alternatively be included and executed either in dialer 114 or in an adjunct processor (not shown) connected to the ACD 104. While implemented in software in the illustrative embodiment of FIG. 1, the customer contact forecast function 122 could alternatively be implemented in hardware of firmware.

The customer contact forecast function 122, together with the other functions of the ACD 104, including the predictive dialer 114, operates to provide a forecast in the form of a probability of a client contact or a prediction of the time until a next client contact. For instance, the customer contact forecast function 122 determines the amount of time it takes to get a live disposition on an incremental outbound call. Accordingly, the customer contact forecast function provides a time horizon in which a prediction as to agent availability is to be made, as described in greater detail elsewhere herein.

In addition, the memory 110 of the ACD 104 may include an agent arrival prediction function 124. The agent arrival prediction function 124 could alternatively be included and executed either in dialer 114 or in an adjunct processor (not shown) connected to the ACD 104. While implemented in software in the illustrative embodiment of FIG. 1, the agent arrival prediction function 124 could alternatively be implemented in hardware or firmware.

Figure 2:
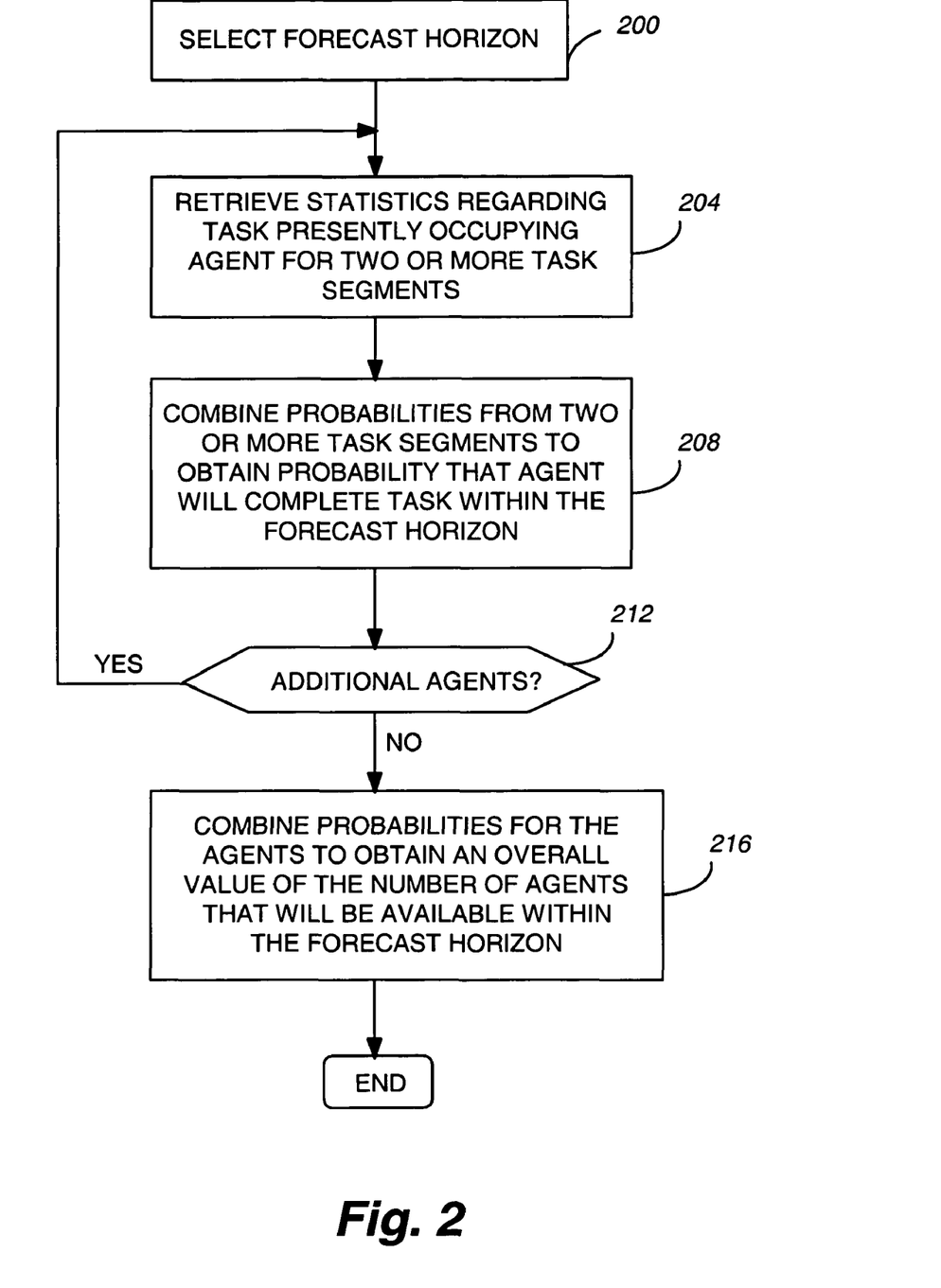
FIG. 2 is a flow chart depicting aspects of the operation of a system in accordance with embodiments of the present invention.

In general, the agent arrival prediction function 124, together with certain of the other functions of the ACD 104, including the customer contact forecast function 122, operates to determine the probability that an agent 156 will be available within a forecast horizon. With reference now to FIG. 2, the operation of a system 100 incorporating an agent arrival prediction function 124 in accordance with an exemplary embodiment of the present invention is illustrated. Initially, at step 200, a forecast horizon is selected. In general, the forecast horizon may comprise a prediction as to the time until a next live disposition is expected in connection with the initiation of a call by a predictive dialer 114. In addition or alternatively, the forecast horizon may comprise a prediction as to the time until a next task requiring service from an agent 156, such as a request for service received as an inbound call from a customer, is received or generated.

At step 204, statistics regarding a task presently occupying an agent 156 associated with the system 100 that could possibly be eligible to service the customer contact are retrieved. Such statistics may be stored in the CMS database 120, or in another database associated with the ACD 104. According to embodiments of the present invention, for each agent 156, the task occupying the agent is considered as two or more segments. The statistics generally comprise a probability distribution related to the availability of an agent engaged in a task segment with respect to time. For instance, the probability that an agent will have completed a task segment after a certain amount of time has elapsed may be expressed as a histogram or other probability distribution function. In addition, the statistics accessed may be composite statistics developed for agents generally, or particular statistics developed for the individual agent under consideration.

At step 208, the probability that the agent under consideration will complete the task in which the agent is engaged within the forecast horizon is determined by combining the probabilities for each of the two or more segments. As will be described in greater detail elsewhere herein, where the two or more segments are sequential, the actual time that the agent has spent within the first segment and the probability associated with a time of zero spent in the additional segment or segments are combined to obtain the probability for that agent. As will also be described in greater detail elsewhere herein, where the segments overlap one another, the actual time spent in each of the segments may be used to obtain a probability for each segment, and the probabilities thus obtained may then be combined to provide a probability as to whether the agent under consideration will become available within the forecast horizon.

A determination is then made as to whether additional eligible agents 156 are associated with the system 100 that need to have a probability determination made (step 212). If eligible agents 156 remain, the process returns to step 204. If all eligible agents 156 have been considered, the probabilities for each of those agents are combined to obtain an overall expected value of the number of agents that will be available within the forecast horizon (step 216). Additionally, a variance of the number of agents that will be available may be obtained. Depending on the expected value and the variance in agent arrivals, the operation of the predictive dialer 114 may be modified, for example to ensure that the number of outgoing calls launched from the ACD 104 is not expected to result in more live dispositions than available agents 156.

Figure 3A:
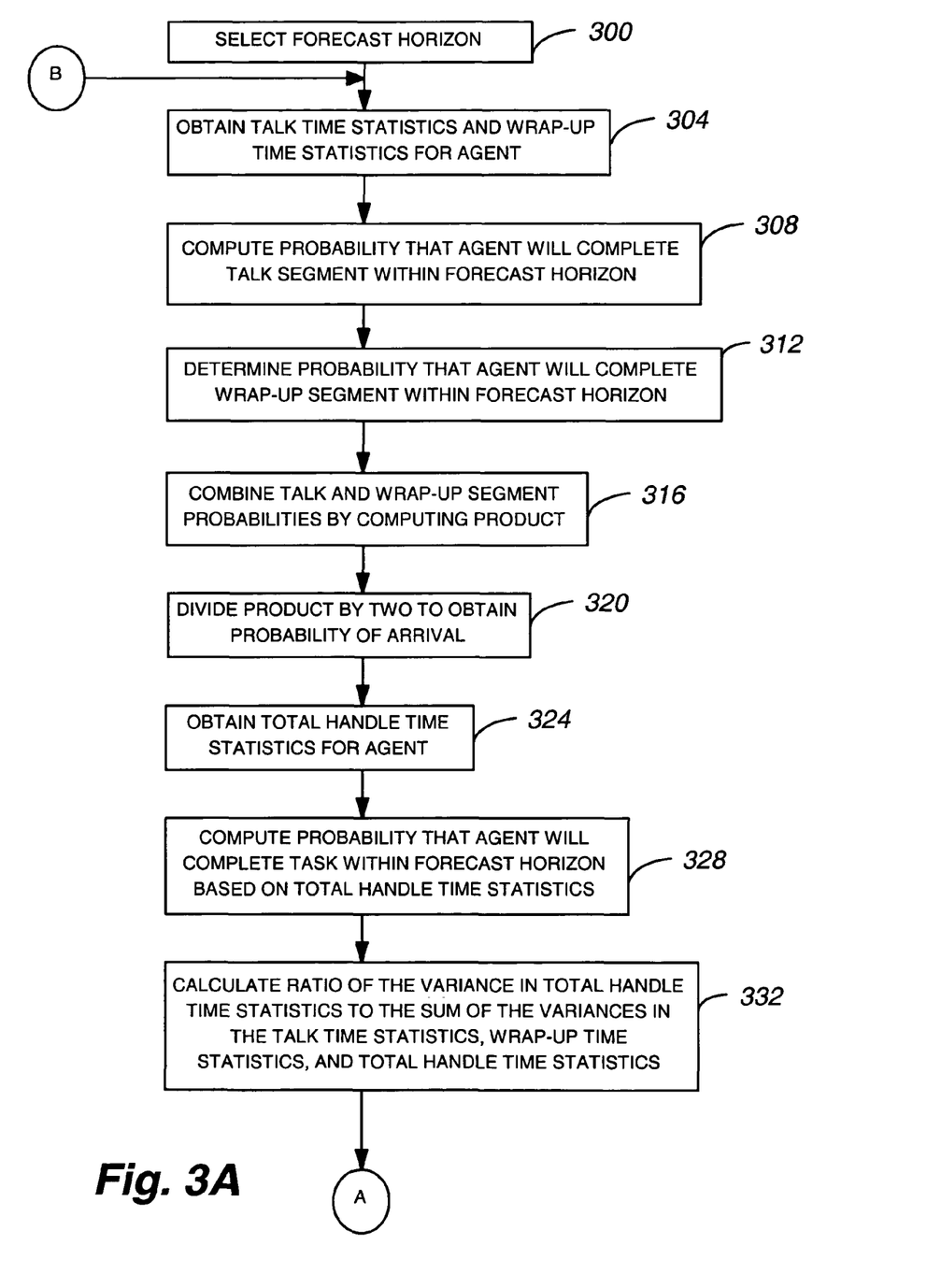
FIG. 3 is a flow chart depicting aspects of the operation of another system in accordance with embodiments of the present invention.
Figure 3B:
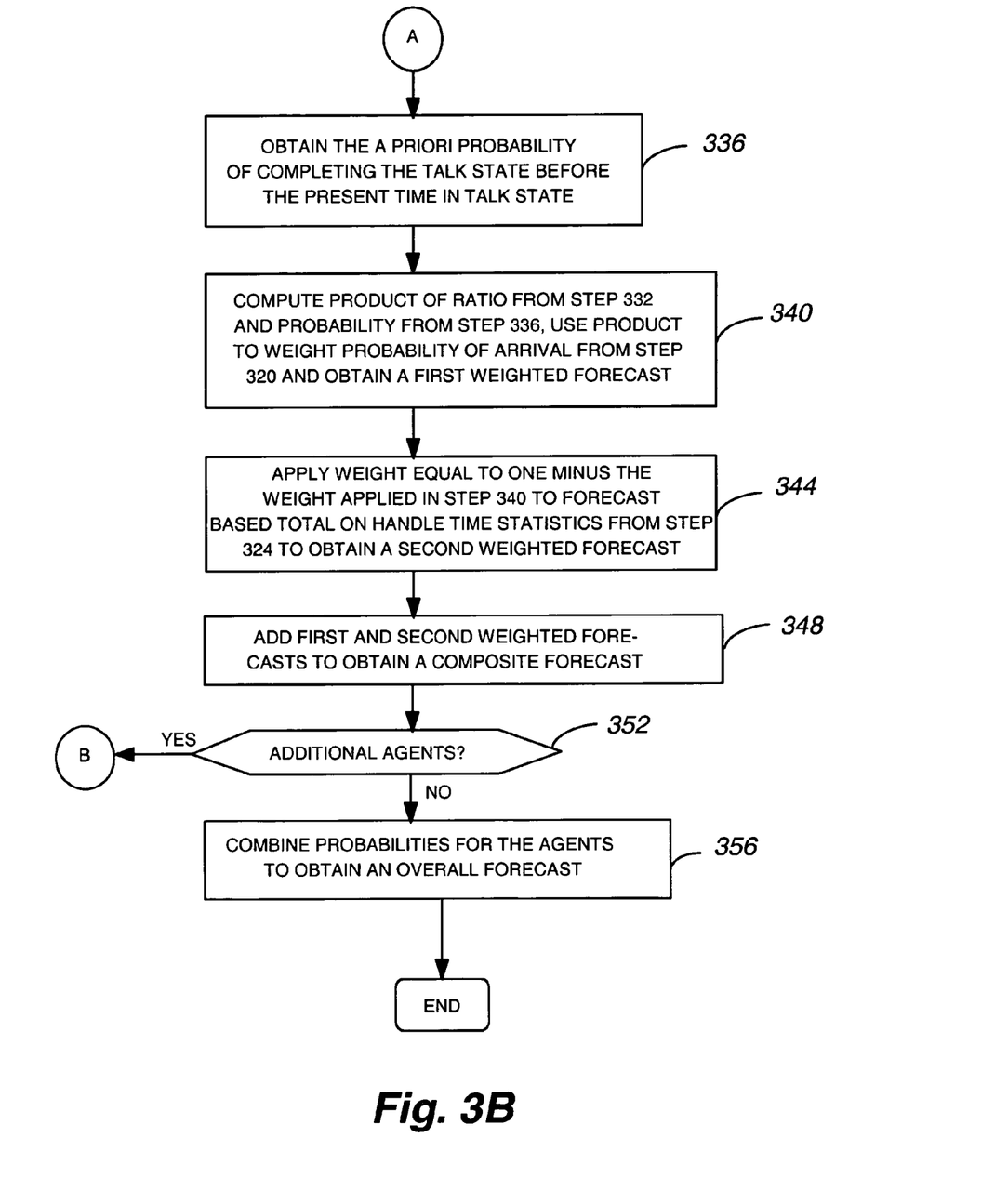

With reference now to FIGS. 3A and 3B, the operation of a system 100 in accordance with a further exemplary embodiment is illustrated. Initially, and with particular reference to FIG. 3A, at step 300, a forecast time horizon is selected. For example, the selection of a forecast time horizon may comprise receiving from a predictive dialer 114 a forecast time until a live disposition on a call.

At step 304, talk time (i.e. a first task segment) statistics and wrap-up time (i.e. a second task segment) statistics are obtained for an agent 156, for the forecast horizon or interval. Using the time that the agent has actually been in talk state and the talk time statistics, a probability (or first probability) that the agent will complete the talk segment of a customer contact or service procedure is determined (step 308). As can be appreciated by one of skill in the art, this results in a value between one and zero for an arrival of the agent within the forecast horizon. In addition, a probability (or second probability) with respect to the completion of wrap-up within the forecast horizon is determined using zero for the time that the agent has been in wrap-up state (step 312). As can be appreciated by one of skill in the art, this gives a value between one and zero for an arrival of the agent within the forecast horizon. Alternatively, a probability that the agent will arrive from wrap-up within the forecast horizon may be determined from a classical regression analysis of wrap-up time from talk time.

The probabilities for arrival of the agent from talk state (the first probability obtained in step 308) and wrap-up state (the second probability obtained in step 312) are then combined (step 316). In accordance with embodiments of the present invention, combining these probabilities comprises computing the product of the probabilities from steps 312 and 316. Alternatively, other combinations of the probability that the agent will arrive from talk state and wrap-up state may be made, such as simple addition, a weighted sum, and combinations of combinations. Where the product of the probabilities is used, the result is divided by two, in order to compensate for the effective doubling of the length of the forecast interval that results from using the same forecast interval in steps 308 and 312, to obtain the probability of arrival ($p_{alt}$) based on talk and wrap-up only (step 320). The step of dividing the result obtained by combining the talk time and wrap-up time statistics assumes that the distribution of occurrences would be uniform in a time interval twice the length of the forecast horizon. Assuming an exponential distribution, the factor would be $$\frac{1}{1+e^{-t_f/T}},$$

where $t_f$ is the length of the forecast time horizon and where T is the mean handle time. This factor approaches one-half as the forecast horizon becomes smaller compared to the mean handle time. Assumptions of other kinds of probability distributions are possible for the purpose of adjusting for the length of the forecast horizon to approximate the probability of arrival within the forecast horizon.

At step 324, total handle time statistics are obtained for an agent 156. From the total handle time statistics, a third probability or forecast, the probability of arrival from the total handle time ($p_w$), with respect to the availability of the agent under consideration is determined (step 328). The ratio of the variance in the total handle time statistics to the sum of the variances in the talk time statistics, wrap-up time statistics, and total handle time statistics is then computed (step 332). In particular, the ratio is given as $$\frac{V_{handle}}{V_{handle}+V_{talk}+V_{wu}}.$$

With reference now to FIG. 3B, at step 336, the a priori probability ($F_{talk}$) of completion of the talk state before the present time in talk state is obtained, for example from the talk time statistics obtained in step 304. The product of the ratio obtained at step 332 and the probability from step 336 is then computed as $w_{talk}=F_{talk}$ $$\frac{V_{handle}}{V_{handle}+V_{talk}+V_{wu}},$$

and used as a weight applied to the probability of arrival ($p_{alt}$) obtained in step 320, to obtain a first weighted forecast, given by $W_{talk}*p_{alt}$ (step 340). Alternatively, a weight based on correlations and coefficients of determination may be applied.

At step 344, a weight equal to one minus the weight applied in step 340 is applied to the forecast based on the total handle time statistics or probability of arrival from the total handle time ($p_w$) obtained at step 328 to obtain a second weighted forecast. This second weighted forecast is given by $(1-w_{talk})p_w$.

A composite forecast is then computed as the sum of the first and second weighted forecasts (step 348). In particular, the composite forecast or composite probability of arrival (p) is given by:

$$p=w_{talk}p_{alt}+(1-w_{talk})p_w.$$

The composite forecast may then be used to provide a probability that the agent under consideration will be available within the forecast horizon.

At step 352, a determination is made as to whether there are additional agents for which a forecast should be prepared. If there are additional agents, the process returns to step 304. If no agents remain, the composite probability of arrival for each of the agents is combined to obtain an overall forecast of the expected value of the number of agents that will be available within the forecast horizon (step 356). Additionally, the probabilities can be used to obtain a variance in the number of agents that will be available.

Embodiments of the present invention facilitate agent allocation and various dispatching operations, especially in an environment of differentiated work and differentiated agents where expeditious service is desired for at least some of the work items. For example, the integration of back-office work with front-office call work, including the integration of outbound call systems with workflow systems and automatic call distributors, can be facilitated. Furthermore, embodiments of the present invention allow a fusion of forecasts to be made for improved forecast accuracy, while avoiding the need to perform a convolution, which would be computationally expensive and complicated to implement.

A workflow system in accordance with embodiments of the present invention can also be used to ensure that an available agent is not assigned to a low priority work item when the agent should be dedicated to higher priority work, such as handling live outgoing or incoming telephone calls. In addition, embodiments of the present invention may be used to assign work to resources in contexts other than call centers featuring live agents. In general, embodiments of the present invention may be applied to distributing work to resources performing tasks that can be differentiated into a number of sub-tasks. Furthermore, embodiments of the present invention allow high service levels and high agent or resource utilization. Accordingly, embodiments of the present invention may be used to provide improved customer service and to reduce the burden on supervision in call centers.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments with various modifications required by their particular application or use of the invention. It is intended that the appended claims be construed to include the alternative embodiments to the extent permitted by the prior art.

What is claimed is:

1. A method for forecasting availability of a resource for a work assignment, comprising:
   selecting a forecast horizon;
   determining for a first segment of a first task, wherein a first task is a single task, a first probability related to an availability of at least a first resource within said forecast horizon, wherein said first resource comprises a first agent;
   determining for a second segment of said first task a second probability related to said availability of said at least a first resource within said forecast horizon, wherein said first and second probabilities are different from one another;
   combining said determined first probability and said determined second probability;
   normalizing a result of said combining said determined first and second probabilities to obtain a probability of agent availability within said selected forecast horizon; and
   applying said obtained probability of agent availability to assign work to a resource having a probability of agent availability that is within said selected forecast horizon, wherein said method comprises the execution of program instructions by a processor to perform said method, wherein said program instructions are recorded in a computer readable storage medium.

2. The method of claim 1, wherein said first probability comprises a probability that said first agent will complete a talk state within said selected horizon, said first probability derived from a time said agent has been in said talk state and a probability distribution for agent time in said talk state,
   and wherein said second probability comprises a probability that said first agent will complete a wrap-up state within said selected time horizon, said second probability derived from a probability distribution for agent time in said wrap-up state.

3. The method of claim 2, wherein said first probability is determined for an actual time said at least said first agent has been in said talk state, and wherein said second probability is determined for zero time in said wrap-up state.

4. The method of claim 1, wherein said first probability comprises a combination of a probability that said first agent will complete a talk state within said selected forecast horizon and a probability that said first agent will complete a wrap-up state within said selected forecast horizon, and wherein said second probability comprises a probability that said at least a first agent will complete a total handle time state within said selected forecast horizon.

5. The method of claim 1, wherein said combining comprises adding said first and second probabilities.

6. The method of claim 1, wherein said combining comprises calculating a product of said determined first probability and said determined second probability, and wherein said normalizing comprises dividing said product by two.

7. The method of claim 2, further comprising:
   computing a third probability, said third probability comprising a probability that said first agent will arrive within said selected horizon, said probability derived from a time said agent has already spent handling said task and a probability distribution for total agent handle time, wherein said third probability comprises a second forecast;
   computing a first variance in agent time in talk state;
   computing a second variance in agent time in wrap-up state;
   computing a third variance in total agent handle time; and
   computing a first ratio, said first ratio comprising a ratio of the third variance to the sum of the first, second and third variances, wherein a measure of the predictability of using, talk and wrap-up time statistics relative to using total handle time statistics is obtained.

8. The method of claim 7, further comprising:
   determining an a priori probability of completion of said talk state before an amount of time equal to an amount of time said first agent has been in said talk state has elapsed;
   computing a product of said a priori probability and said first ratio to obtain a first weight;
   computing a product of said first weight and said first forecast to obtain a first weighted forecast;

subtracting said first weight from one to obtain a second weight;

computing a product of said second weight and said second forecast to obtain a second weighted forecast; and computing a composite forecast by computing a sum of said first weighted forecast and said second weighted forecast.

9. The method of claim 1, wherein a probability of arrival is calculated for a plurality of resources.

10. The method of claim 9, wherein said probabilities of arrival for each of said plurality of resources are combined to obtain said first forecast.

11. The method of claim 1, wherein said selected forecast horizon comprises a forecast time until an outbound call is completed to a live person.

12. The method of claim 1, further comprising using said first forecast to determine whether or not to place an outgoing call.

13. The method of claim 1, wherein said method is performed by operation of a logic circuit.

14. A method for forecasting arrivals of agents, comprising:

selecting a forecast horizon;

forecasting using an automatic call distributor the number of agents associated with the automatic call distributor that are available within said selected horizon, said forecasting including:

determining a probability of completion of talk state within the forecast horizon for each of a plurality of agents;

determining a probability of completion of wrap-up state within the forecast horizon for each of said plurality of agents assuming each is at the start of wrap-up;

for each of said plurality of agents, combining said determined probability of completion of talk state and said determined probability of completion of wrap-up state to obtain an agent arrival probability for each of said plurality of agents within said forecast horizon;

combining said agent arrival probabilities for each of said plurality of agents to obtain a first forecast; and initiating an outbound call when said first forecast indicates an excess supply of agents.

15. The method of claim 14, wherein said combining said agent arrival probabilities for each of said plurality of agents to obtain a first forecast comprises:

aggregating a supply of agents as a sum of probabilities of arrival of each individual agent included in said supply of agents.

16. The method of claim 14, wherein said forecast horizon is selected from one of a time corresponding to said predicted time to a live disposition on outbound calls, an amount of time an agent is predicted to be occupied by work having a lower priority than a priority of work comprising servicing an outbound call, and an amount of time required to recall an agent from lower priority work to work comprising servicing an outbound call.

17. The method of claim 13, wherein said first forecast is provided as an input to a predictive dialer.

18. A work distribution system, comprising:

means for predicting a time to a next work item requiring an agent;

means for accessing a first agent current work segment statistic;

means for accessing a second agent current work segment statistic;

means for determining a first probability of completing said first agent work segment within said predicted time at an elapsed time in said first work segment by applying at least said first agent work segment statistic;

means for determining a second probability of completing said second agent work segment within said predicted time at zero elapsed time in said second work segment by applying at least said second agent work segment statistic;

means for combining said first and second probabilities to obtain an agent arrival probability within said predicted time; and means for placing outbound calls, wherein said agent arrival probability is provided as an input to said means for placing outbound calls.

19. The system of claim 18, further comprising means for combining agent arrival probabilities for each of a plurality of agents to obtain said agent arrival probability within said predicted time.

20. The system of claim 18, further comprising:

means for accessing a third agent work segment statistic, said third agent work segment spanning said first and second work segments; and means for determining a third probability of completing said third agent work segment within said predicted time at an elapsed time in said third work segment, wherein said means for combining comprises means for combining said first, second and third probabilities to obtain an agent arrival probability within said predicted time.

* * * * *

UNITED STATES PATENT AND TRADEMARK OFFICE
CERTIFICATE OF CORRECTION

| | | |
|---|---|---|
| PATENT NO. | : 7,885,401 B1 | |
| APPLICATION NO. | : 10/813509 | |
| DATED | : February 8, 2011 | |
| INVENTOR(S) | : David Clarence Mullen | |

It is certified that error appears in the above-identified patent and that said Letters Patent is hereby corrected as shown below:

At column 8, line 33, after "probability that said" delete "at least a".

Signed and Sealed this
Twelfth Day of April, 2011

David J. Kappos
*Director of the United States Patent and Trademark Office*